(12) United States Patent
Eller et al.

(10) Patent No.: US 8,209,433 B2
(45) Date of Patent: Jun. 26, 2012

(54) CONGESTION MANAGEMENT AND LATENCY PREDICTION IN CSMA MEDIA

(75) Inventors: Riley Eller, Seattle, WA (US); Dennis Edwards, Seattle, WA (US); Jeremy Bruestle, Seattle, WA (US); Mark L. Tucker, Seattle, WA (US)

(73) Assignee: CoCo Communications Corp., Seattle, WA (US)

( * ) Notice: Subject to any disclaimer, the term of this patent is extended or adjusted under 35 U.S.C. 154(b) by 252 days.

(21) Appl. No.: 12/278,146

(22) PCT Filed: Feb. 1, 2007

(86) PCT No.: PCT/US2007/061485
§ 371 (c)(1),
(2), (4) Date: Jun. 26, 2009

(87) PCT Pub. No.: WO2007/127518
PCT Pub. Date: Nov. 8, 2007

(65) Prior Publication Data
US 2009/0307372 A1  Dec. 10, 2009

Related U.S. Application Data

(60) Provisional application No. 60/764,013, filed on Feb. 1, 2006, provisional application No. 60/763,977, filed on Feb. 1, 2006, provisional application No. 60/763,959, filed on Feb. 1, 2006.

(51) Int. Cl.
*G06F 15/16* (2006.01)
*G06F 15/173* (2006.01)

(52) U.S. Cl. .................................. 709/235; 709/224
(58) Field of Classification Search .................. 709/223, 709/224, 235; 370/252, 241
See application file for complete search history.

(56) References Cited

U.S. PATENT DOCUMENTS

| | | | | |
|---|---|---|---|---|
| 7,295,614 | B1 * | 11/2007 | Shen et al. | 375/240.25 |
| 7,453,885 | B2 * | 11/2008 | Rogers | 370/395.4 |
| 7,529,247 | B2 * | 5/2009 | Rogers | 370/395.2 |
| 7,535,839 | B2 * | 5/2009 | Kadaba et al. | 370/230 |
| 7,551,559 | B1 * | 6/2009 | Jonnala et al. | 370/230 |
| 7,751,370 | B2 * | 7/2010 | Tiedemann et al. | 370/335 |
| 7,782,786 | B1 * | 8/2010 | Natarajan et al. | 370/244 |
| 8,005,030 | B2 * | 8/2011 | Stephenson et al. | 370/310 |
| 8,040,811 | B2 * | 10/2011 | Edwards et al. | 370/241 |
| 8,068,437 | B2 * | 11/2011 | Hardy | 370/252 |
| 2002/0131386 | A1 | 9/2002 | Gwon | |
| 2003/0043925 | A1 * | 3/2003 | Stopler et al. | 375/254 |
| 2006/0171523 | A1 * | 8/2006 | Greenwell | 379/242 |
| 2008/0052394 | A1 * | 2/2008 | Bugenhagen et al. | 709/224 |
| 2008/0270124 | A1 * | 10/2008 | Son et al. | 704/205 |

FOREIGN PATENT DOCUMENTS

JP    2001142747    5/2001

* cited by examiner

*Primary Examiner* — Kristie Shingles
(74) *Attorney, Agent, or Firm* — Lowe Graham Jones PLLC

(57) ABSTRACT

A facility for congestion management and latency prediction is described. In various embodiments, the facility sums a series of fractional transmission delays wherein each fractional transmission delay is measured as a probability of a failed transmission attempt multiplied by the cost of the failed transmission attempt, and provides the sum.

17 Claims, 1 Drawing Sheet

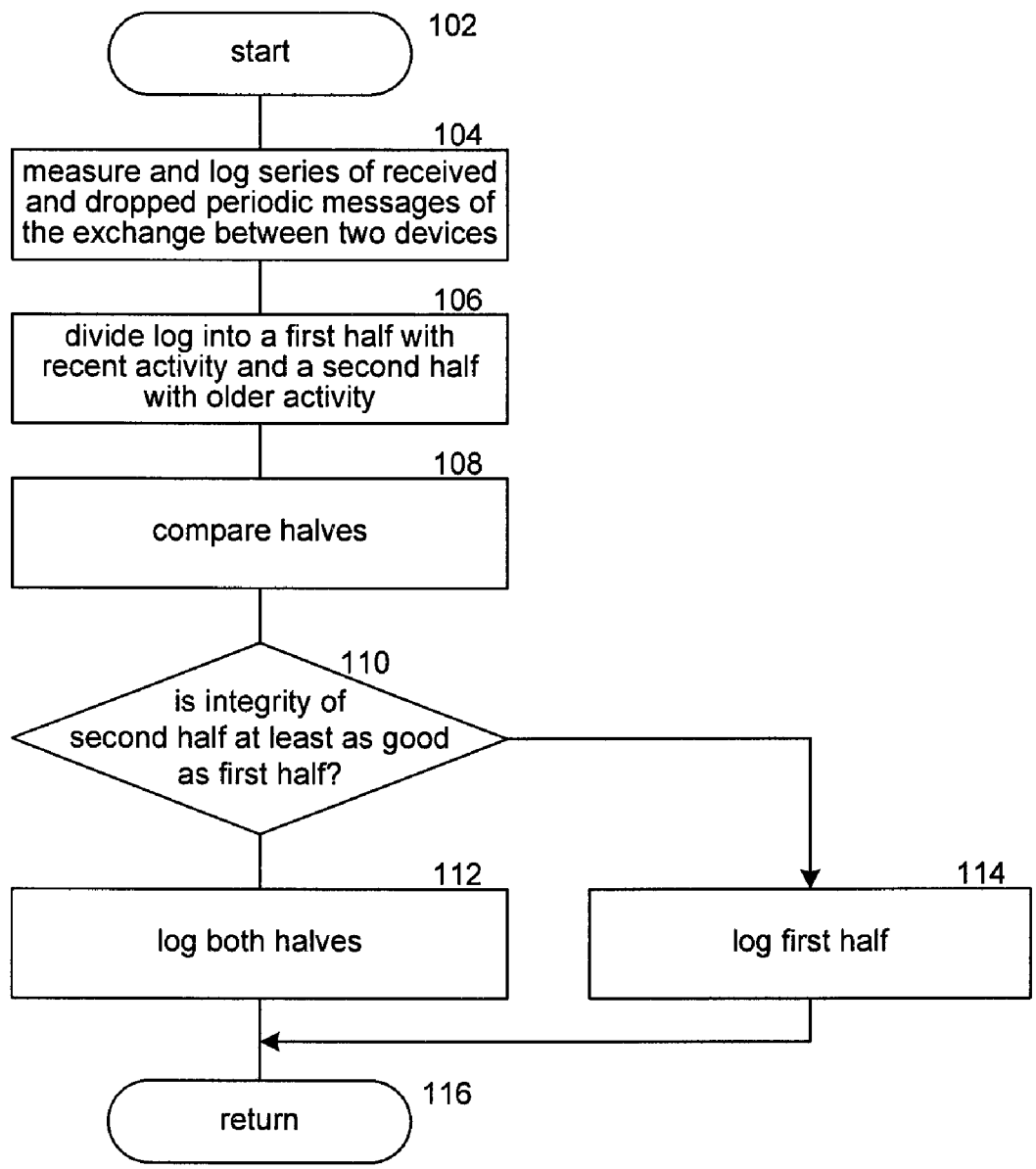

CONGESTION MANAGEMENT AND LATENCY PREDICTION IN CSMA MEDIA

CROSS-REFERENCE TO RELATED APPLICATION(S)

This application is a U.S. National Stage application of International Application No. PCT/US07/61485, entitled "CONGESTION MANAGEMENT AND LATENCY PREDICTION IN CSMA MEDIA," filed Feb. 1, 2007, which claims the benefit of U.S. Provisional Patent Application Ser. No. 60/764,013, entitled "CONGESTION MANAGEMENT AND LATENCY PREDICTION IN CSMA MEDIA," filed Feb. 1, 2006, and is related to U.S. Provisional Patent Application Ser. No. 60/763,977 entitled "PROTOCOL CIRCUIT LAYER," filed Feb. 1, 2006, and U.S. Provisional Patent Application Ser. No. 60/763,959 entitled "PROTOCOL LINK LAYER," filed Feb. 1, 2006.

BACKGROUND

Computers have been networked to exchange data between them for decades. One important network, the Internet, comprises a vast number of computers and computer networks interconnected through communication channels. The Internet is used for various reasons, including electronic commerce, exchanging information such as electronic mail, retrieving information and doing research, and the like. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special purpose application program for requesting and displaying web pages.

Currently, web pages are often defined using HyperText Markup Language ("HTML"). HTML provides a standard set of tags that define how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

New protocols exist, such as Extensible Mark-up Language ("XML") and Wireless Access Protocol ("WAP"). XML provides greater flexibility over HTML. WAP provides, among other things, the ability to view web pages over hand-held, wireless devices, such as cell phones and portable computers (e.g. PDA's). All of these protocols provide easier ways to provide information to people via various data processing devices. Many other protocols and means for exchanging data between data processing device continue to develop to further aid the exchange of information.

In wireless communications, it is common to remedy the problem of media collision by using acknowledged receipt with finite retransmission strategy for point-to-point messages. In order to allow for communication networks of varying density and to ameliorate congestion, it is also common to use delays with an exponentially-increasing coefficient. Broadcast messages, however, may not be able to effectively use acknowledged receipt because the number of recipients is unreliable.

One undesirable characteristic of this strategy is that the most congested and least reliable communication links tend to experience the highest message delivery latency. That latency tends also to increase the probability that another message will be waiting on queue before the completion of the previous message delivery. The combination of these factors tends to worsen the initial congestion, making it decreasingly likely that the network will recover on its own. In order to avoid this set of problems, it may be necessary to make routing decisions farther away from the congestion point. That in turn may require a method for the nodes in the congested region to report their propensity for message delay.

Naïve methods for measuring message delay collect only one timing datum per message, and then require a significant number of messages to create a reasonable approximation of the current retransmission delay. These estimates tend to be skewed with respect to time, and that skew tends to be unresponsive to the same bursts of activity that cause the initial congestion to become unmanageable.

BRIEF DESCRIPTION OF THE DRAWINGS

FIG. 1 is a flow diagram illustrating a technique for congestion management and latency prediction in CSMA media.

DETAILED DESCRIPTION

Estimating Peer Broadcast Reliability

The basic unit of measure in this method is the broadcast message. Each participating node transmits a short broadcast message on a fixed interval. The format of the message is a simple bitfield representing an integer counter that increments by 1 each transmission. Each recipient measures the time between any two messages and divides that duration by the difference in the message counter to derive the sender's transmission period. For every such period that passes, the recipient records a single bit regarding whether that sender's transmission was received (one) or not received (zero). The history of these bits forms the basis for the measurement "peer broadcast reliability".

Using an ordered series of bits to represent the history of receipts and failures, we can estimate the likelihood of receiving any one broadcast from a given peer by counting the ones and dividing by the number of bits in the series. Since the information becomes decreasingly valuable over time, it is desirable to remove the oldest data from time to time. Using a simple static series length tends to suffer from one of two problems: either the series is too short which makes the algorithm respond too quickly to momentary events, or else the series is too long which makes the algorithm respond too slowly to avoid the initial congestion.

To avoid these problems, we split the series into halves. We create a null hypothesis that the difference between the proportion of ones in each of the two subseries is not statistically significant. After we record each element into the series, we evaluate the null hypothesis. If the null hypothesis is demonstrated to be false, then we discard the oldest half of the series. In this fashion, the history grows during periods of relatively stable communication and provides a stable estimate of the peer broadcast reliability. When bursts of congestion occur, the probability of broadcast reception decreases rapidly and the newer half of the history becomes significantly worse than the oldest half. In this situation, the estimate of peer broadcast reliability becomes relatively volatile in order to quickly respond to the changing state of the medium.

Predicting Unicast Transmission Latency

In order to extend a relatively accurate estimate of peer broadcast reliability into a prediction of unicast transmission latency, it may be necessary to extend the justification for broadcast loss into the algorithm for unicast retransmission. Pleasantly, modern back-off algorithms use simple integer coefficients that double with each failed transmission. Thus the unicast latency can be seen as the summation of a series of fractional transmission delays, each defined as the probability of failed transmission attempt multiplied by the cost of that transmission attempt. For transmission schemes using a $2^n$ exponential back-off algorithm, the predicted latency is proportional to $2^{(r/p)}$ where p is the peer broadcast reliability and r is the retry delay.

Semantic Concepts Involved
  transmission latency
  message delay
  predictive algorithm
  CSMA Media
  media collision
  retransmission strategy
  backoff algorithm
  exponential backoff
  network congestion
  congestion point FIG. 1 is a flow diagram illustrating a routine for providing congestion management and latency prediction in CSMA media. At block 102, the routine begins. At block 104, the routine measures and logs a series of received and dropped periodic messages exchanged between two networked devices. At block 106, the routine divides the log into a first half containing recent activity and a second half containing older activity. At block 108, the routine compares the integrity (and perhaps other properties) of the two halves. If the integrity of the older half is at least as good as the integrity of the first half, the routine continues at block 112. Otherwise, the routine continues at block 114. At block 112, the routine logs both halves. At block 114, the routine logs the half containing recent activity. At block 116, the routine returns.

The described technology provides at least a method for predicting latency of links in broadcast networks and a method for managing congestion in broadcast networks.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A non-transitory computer-readable medium comprising executable program code that when executed by a processing element implements a method to determine data-transmission congestion between a first network node and a second network node, the method comprising:

monitoring a series of received and dropped messages periodically provided by the first network node to the second network node, wherein the received messages are associated with a first bit and the dropped messages are associated with a second bit;

generating, as each new message is monitored, a log of data comprising a first number of bits, wherein the log of data is an ordered series of the first and second bits ordered from a current bit associated with a current message to an oldest bit associated with an oldest message, wherein each bit is one of a first binary number that indicates that the message was received and a second binary number that indicates that the message was dropped, wherein the bit associated with the new monitored message is added as the current bit into the log of data, and wherein the oldest bit is removed from the log of data;

dividing, as each new message is monitored, the log of data into a first log portion containing the bits associated with messages monitored during a first time period and a second log portion containing the bits associated with messages monitored during a second time period, wherein the second time period is earlier than the first time period;

determining, as each new message is monitored, integrity of the first log portion, wherein the integrity of the first log portion corresponds to a number of the first bits in the first log portion;

determining, as each new message is monitored, integrity of the second log portion, wherein the integrity of the second log portion corresponds to a number of the first bits in the second log portion;

comparing, as each new message is monitored, the integrity of the first log portion and the integrity of the second log portion;

if the integrity of the first log portion is at least equal to the integrity of the second log portion by a predetermined criterion, continuing to generate the log of data using the first number of bits as a next message is provided; and if the integrity of the first log portion is less than the integrity of the second log portion by the predetermined criterion, discarding the second log portion continuing to generate the log of data using a second number of bits as the next message is provided, wherein the second number of bits corresponds to the number of the bits in the first log portion.

2. The medium of claim 1, wherein monitoring further includes monitoring the next message provided by the second network node to the first network node, wherein one of the first bit and the second bit is generated based on whether the next message is received or dropped, and wherein the generated bit is added as the current bit of the log of data.

3. The medium of claim 1, wherein the first and second log portions comprise two halves of the log of data.

4. The medium of claim 1, wherein the predetermined criterion comprises the integrity of the second log portion being greater than or equal to the integrity of the first log portion.

5. The medium of claim 1, wherein the integrity of the first log portion corresponds to a ratio of first bits to the total number of bits in the first log portion, and wherein the integrity of the second log portion corresponds to a ratio of first bits to the total number of bits in the second log portion.

6. The medium of claim 1, wherein determining the integrity of the first log portion and the integrity of the second log portion comprises:

determining, as each new message is monitored, a first log portion percentage, wherein the first log portion percentage corresponds to a number of the first bits and the second bits in the first log portion; and determining, as each new message is monitored, a second log portion percentage, wherein the second log portion percentage corresponds to a number of the first bits and the second bits in the second log portion, wherein if the first log portion percentage is at least equal to the second log portion percentage by a predetermined criterion, continuing to generate the log of data using the first number of bits as a next message is provided, and wherein if the first log portion percentage is less than the second log portion percentage by the predetermined criterion, discarding the second log portion and continuing to generate the log of data using a second number of bits as the next message is provided, wherein the second number of bits corresponds to the number of bits in the first log portion.

7. The medium of claim 1, wherein after the first log portion has been discarded in response to the previously compared integrity of the first log portion being less than the integrity of the second log portion by the predetermined criterion, and wherein the generated log of data has been generated using the second number of bits, the method further comprising:

dividing, as the next message is monitored, the generated log of data having the second number of bits into a new first log portion containing data associated with messages monitored during a new first time period and a new second log portion containing data associated with messages monitored during a new second time period occurring earlier than the new first time period, wherein a sum of the new first time period and the new second time period equals to a time period over which the bits of the generated log of data having the second number of bits was accumulated;

determining, as the next message is monitored, integrity of the new first log portion, wherein the integrity of the new first log portion corresponds to a number of the first bits in the new first log portion;

determining, as the next message is monitored, integrity of the new second log portion, wherein the integrity of the new second log portion corresponds to a number of the first bits in the new second log portion;

comparing, as the next message is monitored, the integrity of the new first log portion and the integrity of the new second log portion;

if the integrity of the new first log portion is at least equal to the integrity of the new second log portion by a predetermined criterion, continuing to generate the log of data using the second number of bits as a subsequent next message is provided; and if the integrity of the new first log portion is less than the integrity of the new second log portion by the predetermined criterion, discarding the new second log portion and continuing to generate the log of data using a third number of bits as the subsequent next message is provided, wherein the third number of bits correspond to the number of bits in the new first log portion.

8. The medium of claim 7, wherein the new first log portion and the new second log portion are two halves of the generated log of data.

9. A system, comprising:
a first network node configured to provide messages to a second network node; and
a third network node configured to:
monitor a series of received and dropped messages periodically provided by the first network node to the second network node;
generate, as each new message is monitored, a log of data indicating whether each said message was received or dropped, wherein the log of data comprises a first number of bits in an ordered series that is ordered from a current bit associated with a current message to an oldest bit associated with an oldest message, wherein each bit is one of a first binary number indicating that the message was received and a second binary number indicating that the message was dropped, wherein the bit associated with the new monitored message is added as the current bit into the log of data, and wherein the oldest bit is removed from the log of data;
divide the log of data into a first log portion containing data associated with messages monitored during a first time period and a second log portion containing data associated with messages monitored during a second time period occurring earlier than the first time period;
compare, as each new message is monitored, an integrity of received messages represented by the first and second bits of the first log portion with an integrity of received messages represented by the first and second bits of the second log portion;
if the compared integrity of the first log portion is at least equal to the integrity of the second log portion by a predetermined criterion, continue to generate in the log of data the first and second portions; and
if the compared integrity of the first log portion is less than the integrity of the second log portion by the predetermined criterion, discard the second log portion.

10. The system of claim 9, wherein the third network node is further configured to monitor a series of received and dropped messages periodically provided by the second network node to the first network node.

11. The system of claim 9, wherein the first log portion and the second log portion are two halves of the log of data.

12. The system of claim 9, wherein the second log portion is discarded.

13. The system of claim 9, wherein the predetermined criterion comprises the integrity of the second log portion being greater than or equal to the integrity of the first log portion.

14. The system of claim 9, wherein the third network node is further configured to:
determine, as each new message is monitored, the integrity of the first log portion, wherein the integrity of the first log portion corresponds to a number of the first bits in the first log portion; and
determine, as each new message is monitored, the integrity of the second log portion, wherein the integrity of the second log portion corresponds to a number of the first bits in the second log portion.

15. The system of claim 9, wherein the third network node is further configured to:
determine, as each new message is monitored, the integrity of the first log portion, wherein the integrity of the first log portion corresponds to a percentage of a number of the first bits in the first log portion; and
determine, as each new message is monitored, the integrity of the second log portion, wherein the integrity of the second log portion corresponds to a percentage of a number of the first bits in the second log portion.

16. A method to determine data-transmission congestion between a first network node and a second network node, the method comprising:
monitoring a series of received and dropped messages periodically provided by the first network node to the second network node, wherein the received messages are associated with a first bit and the dropped messages are associated with a second bit;

generating, as each new message is monitored, a log of data comprising a first number of bits, wherein the log of data is an ordered series of the first and second bits ordered from a current bit associated with a current message to an oldest bit associated with an oldest message, wherein each bit is one of a first binary number and a second binary, wherein the first binary number indicates that the associated said message was received, wherein the second binary number indicates that the associated said message was dropped, wherein the bit associated with the new monitored message is added as the current bit into the log of data, and wherein a bit associated with the oldest message is removed from the log of data;

dividing, as each new message is monitored, the log of data into a first log portion containing the bits associated with messages monitored during a first time period and a second log portion containing the bits associated with messages monitored during a second time period, wherein the second time period is earlier than the first time period;

determining, as each new message is monitored, integrity of the first log portion, wherein the integrity of the first log portion corresponds to a number of the first bits in the first log portion;

determining, as each new message is monitored, integrity of the second log portion, wherein the integrity of the second log portion corresponds to a number of the first bits in the second log portion;

comparing, as each new message is monitored, the integrity of the first log portion and the integrity of the second log portion;

if the integrity of the first log portion is at least equal to the integrity of the second log portion by a predetermined criterion, continuing to generate the log of data using the first number of bits as a next message is provided; and if the integrity of the first log portion is less than the integrity of the second log portion by the predetermined criterion, discarding the second log portion and continuing to generate the log of data using a second number of bits as the next message is provided, wherein the second number of bits corresponds to the number of bits in the first log portion.

17. The method of claim 16, wherein monitoring further includes monitoring the next message provided by the second network node to the first network node, wherein one of the first bit and the second bit is generated based on whether the next message is received or dropped, and wherein the generated bit is added as the current bit of the log of data.

* * * * *